United States Patent
Yan et al.

(10) Patent No.: US 12,325,089 B2
(45) Date of Patent: Jun. 10, 2025

(54) GAS CONTROL SYSTEM AND METHOD FOR A REFLOW SOLDERING FURNACE

(71) Applicant: Illinois Tool Works Inc., Glenview, IL (US)

(72) Inventors: Shenghu Yan, Suzhou New District (CN); Peng Shu, Suzhou New District (CN); Dong Zhang, Suzhou New District (CN)

(73) Assignee: Illinois Tool Works Inc., Glenview, IL (US)

( * ) Notice: Subject to any disclaimer, the term of this patent is extended or adjusted under 35 U.S.C. 154(b) by 359 days.

(21) Appl. No.: 17/271,465

(22) PCT Filed: Aug. 30, 2019

(86) PCT No.: PCT/US2019/049113
§ 371 (c)(1),
(2) Date: Feb. 25, 2021

(87) PCT Pub. No.: WO2020/047442
PCT Pub. Date: Mar. 5, 2020

(65) Prior Publication Data
US 2021/0339330 A1    Nov. 4, 2021

(30) Foreign Application Priority Data
Aug. 31, 2018   (CN) .................. 201811013268.3

(51) Int. Cl.
*B23K 3/08*     (2006.01)
*B23K 1/00*     (2006.01)
(Continued)

(52) U.S. Cl.
CPC ............. *B23K 3/08* (2013.01); *B23K 1/0016* (2013.01); *B23K 1/008* (2013.01); *B23K 35/383* (2013.01); *G05D 27/02* (2013.01); *B23K 2101/42* (2018.08)

(58) Field of Classification Search
None
See application file for complete search history.

(56) References Cited

U.S. PATENT DOCUMENTS 6,074,203 A * 6/2000 Leturmy .............. G05D 11/138
                                                                432/37
6,780,225 B2 * 8/2004 Shaw ...................... B23K 1/012
                                                                228/43
2007/0246512 A1  10/2007 Kazi

FOREIGN PATENT DOCUMENTS

CN          1476512         2/2004
CN          101058123       10/2007
(Continued)

OTHER PUBLICATIONS

Binjun Xi, "N_2 Reflow Oven", Full Pages, Oct. 30, 1994, Full Pages, No. 4 of "Electronic Industry-Specific Device".
(Continued)

*Primary Examiner* — Devang R Patel
(74) *Attorney, Agent, or Firm* — McAndrews, Held & Malloy, Ltd.

(57) ABSTRACT

The present application relates to a gas control system and method for a reflow soldering furnace, comprising: an oxygen detecting device, capable of coming into contact with a gas in a furnace chamber, for detecting an oxygen concentration in the furnace chamber; an intake valve device, for controllably establishing fluid communication between a working gas source and the furnace chamber, thereby inputting the working gas into the furnace chamber; and a controller, for controlling the opening extent of at least
(Continued)

one intake valve device based on an oxygen concentration signal, thereby regulating a flow rate of the working gas inputted into the furnace chamber. With a gas control system and method according to the present application, an oxygen concentration in a furnace chamber is detected in real time, and a gas control valve is automatically regulated on the basis of a predetermined set value or target value to control input of a working gas, achieving precise control and fast regulation; in addition, when work is stopped or during work intermissions, a gas control valve can be closed in a timely manner, thereby preventing waste and reducing costs.

7 Claims, 5 Drawing Sheets

(51) Int. Cl.
   *B23K 1/008* (2006.01)
   *B23K 35/38* (2006.01)
   *G05D 27/02* (2006.01)
   *B23K 101/42* (2006.01)

(56) References Cited

FOREIGN PATENT DOCUMENTS

| | | |
|---|---|---|
| CN | 201293946 | 8/2009 |
| CN | 101881463 | 11/2010 |
| CN | 102105189 | 6/2011 |
| CN | 102266630 | 12/2011 |
| CN | 102375458 | 3/2012 |
| CN | 102575620 | 7/2012 |
| CN | 103861489 | 6/2014 |
| CN | 104423405 | 3/2015 |
| CN | 204474325 | 7/2015 |
| CN | 104871655 | 8/2015 |
| CN | 105031796 | 11/2015 |
| CN | 105674570 | 6/2016 |
| CN | 205309492 | 6/2016 |
| CN | 205309503 | 6/2016 |
| CN | 205834426 | 12/2016 |
| CN | 206270689 | 6/2017 |
| CN | 106970187 | 7/2017 |
| CN | 107120200 | 9/2017 |
| CN | 107366550 | 11/2017 |
| CN | 207289104 | 5/2018 |
| EP | 2747512 A1 * | 6/2014 |
| GB | 561408 | 5/1944 |
| JP | H03101296 | 4/1991 |
| JP | H06344176 A * | 12/1994 |
| JP | H07212030 A * | 8/1995 |
| JP | 08172263 A * | 7/1996 |
| JP | H08172263 A * | 7/1996 |
| JP | H11340618 A * | 12/1999 |
| JP | 2000122725 | 4/2000 |
| JP | 2007136549 | 6/2007 |
| JP | 2011038976 A * | 2/2011 |
| JP | 2013098417 | 5/2013 |
| JP | 2014157879 A * | 8/2014 |
| WO | 2017110066 | 6/2017 |

OTHER PUBLICATIONS

International Search Report and Written Opinion corresponding to International Patent Application No. PCT/US2019/049113, mailed Nov. 25, 2019.
Japanese Office Action Appln No. 2021-510656 dated Jul. 18, 2023.
European Examination Report Appln No. 19770224.4 dated Jul. 26, 2023.

* cited by examiner

GAS CONTROL SYSTEM AND METHOD FOR A REFLOW SOLDERING FURNACE

RELATED APPLICATIONS

This application is a national stage application under 35 U.S.C. § 371 of PCT Application Serial No. PCT/US2019/049113, filed on Aug. 30, 2019, and entitled "GAS CONTROL SYSTEM AND METHOD FOR A REFLOW SOLDERING FURNACE," and claims priority to Chinese Patent Application Serial No. 201811013268.3, filed Aug. 31, 2018. The entireties of PCT Application Serial No. PCT/US2019/049113 and Chinese Patent Application Serial No. 201811013268.3 are incorporated herein by reference.

TECHNICAL FIELD

The present application relates to a reflow soldering furnace, in particular to a gas control system and method for a reflow soldering furnace.

BACKGROUND

In the manufacture of a printed circuit board, electronic components are installed on a circuit board generally by a process known as "reflow soldering". In a typical reflow soldering process, a soldering paste, for example, a tin paste, is deposited in a selected area on a circuit board, and the conducting wires of one or more electronic components are inserted into the deposited soldering paste. Then, the circuit board is passed through a reflow soldering furnace. In the reflow soldering furnace, the soldering paste is caused to reflow in a heating zone (that is, for being heated to fusion or a reflow temperature) and is then cooled in a cooling zone, thereby electrically and mechanically connecting the electronic components to the circuit board. The term "circuit board" used herein includes a basal plate element of an electronic component of any type, for example, a wafer basal plate.

In a reflow soldering furnace, air or a basically inert gas, for example, nitrogen, is generally used as a working gas. For circuit boards having different process requirements, different working gases are used. The furnace chamber of a reflow soldering furnace is filled with a working gas, and soldering is performed in the working gas when a circuit board is conveyed into the furnace chamber by a conveying device. For a reflow soldering furnace that uses a basically inert gas as a working gas, external air inevitably enters the furnace chamber of the reflow soldering furnace when the furnace is working, consequently generating oxygen in the furnace chamber. If the oxygen concentration reaches or exceeds a certain level, soldering will be affected adversely; for example, a soldered component may be oxidized. Therefore, it is necessary to, when a reflow soldering furnace is working, maintain a desired oxygen concentration by supplying additional working gas to the furnace chamber.

BRIEF SUMMARY

Different soldering processes require different concentrations of working gases. Generally, a concentration of a working gas is reflected by parts per million (PPM). The lower the oxygen concentration is, the higher the concentration of the working gas is. When a reflow soldering furnace is working, the concentration of a working gas often needs to be adjusted as required by the soldering process, and a gas control valve needs to be regulated manually; consequently, the control precision is low and regulation is slow. When work is stopped or during work intermissions, failure to close a gas control valve will also lead to waste of the working gas and an energy loss, increasing production costs.

The present application provides a gas control system and method for a reflow soldering furnace, in which an oxygen concentration in a furnace chamber is detected in real time, and a gas control valve is automatically regulated on the basis of a predetermined set value or target value to control input of a working gas, thereby ensuring that a concentration of the working gas in the furnace chamber meets the requirements of the soldering process. With a gas control system and method according to the present application, precise control and fast regulation is achieved; in addition, when work is stopped or during work intermissions, a gas control valve can be closed in a timely manner, thereby preventing waste and reducing costs.

In one aspect, the present application provides a gas control system for a reflow soldering furnace, a furnace chamber of the reflow soldering furnace containing a gas, the gas comprising oxygen and a working gas, wherein the gas control system comprises: an oxygen detecting device, capable of coming into contact with a gas in a furnace chamber, for detecting an oxygen concentration in the furnace chamber, wherein said oxygen detecting device generates an oxygen concentration signal based on the detected oxygen concentration; at least one intake valve device, for controllably establishing fluid communication between a working gas source and the furnace chamber, thereby inputting the working gas into the furnace chamber; and a controller, configured to control the opening extent of at least one intake valve device based on an oxygen concentration signal, thereby regulating a flow rate of the working gas inputted into the furnace chamber.

In the gas control system as described above, the furnace chamber comprises a peak value zone; the oxygen detecting device comes into contact with a gas in the peak value zone, for detecting an oxygen concentration in the peak value zone.

In the gas control system as described above, the working environment of the furnace chamber requires an oxygen concentration reaching a target set value; said controller, based on an actual detection value reflected by an oxygen concentration signal and a target set value, controls the opening extent of at least one intake valve device.

In the gas control system as described above, the furnace chamber comprises a preheating zone; at least one intake valve device establishes fluid communication between the preheating zone and a working gas source.

In the gas control system as described above, the furnace chamber further comprises a cooling zone; said at least one intake valve device comprises a first intake valve device and a second intake valve device, wherein said first intake valve device establishes fluid communication between said preheating zone and said working gas source, and said second intake valve device establishes fluid communication between said cooling zone and said working gas source.

In the gas control system as described above, said controller is configured to be capable of identifying a regulation set value of an oxygen concentration, said regulation set value being greater than a target set value; said controller is configured to, when an actual detection value reflected by said oxygen concentration signal is greater than said regulation set value, increase the opening extent of said first intake valve device and that of said second intake valve device; and said controller is configured to, when an actual detection value reflected by said oxygen concentration signal is smaller than said regulation set value, keep the opening extent of said first intake valve device at a preset value and regulate the opening extent of said second intake valve device.

The gas control system as described above further comprises: a working state indicating device, for indicating whether the reflow soldering furnace is in a state of processing a circuit board or in a state of not processing any circuit board, wherein when the working state indicating device indicates that the reflow soldering furnace is in a state of not processing any circuit board, said controller is configured to cause said at least one intake valve device to output and supply a working gas at the lowest flow rate.

In the gas control system as described above, the oxygen detecting device comprises: a sampling device, in fluid communication with the furnace chamber, for collecting a gas in the furnace chamber, and an oxygen analyzer, connected to said sampling device, for analyzing an oxygen concentration in the collected gas, wherein said oxygen analyzer is connected to said controller, for generating an oxygen concentration signal based on an oxygen concentration obtained by an analysis with said oxygen analyzer, and transferring said oxygen concentration signal to said controller.

In the gas control system as described above, the oxygen detecting device comprises: an oxygen probe, inserted into said furnace chamber, for detecting an oxygen concentration in said furnace chamber, wherein said oxygen probe is connected to said controller, for generating an oxygen concentration signal based on an oxygen concentration detected by said oxygen probe, and transferring said oxygen concentration signal to said controller.

In the gas control system as described above, each of said at least one intake valve device comprises: a pressure-proportioning valve, wherein said pressure-proportioning valve is connected to a working gas source, for receiving a working gas from said working gas source, and said pressure-proportioning valve is connected to said controller, for regulating gas pressure as controlled by said controller; and a throttling valve, said throttling valve being connected to said pressure-proportioning valve, for linearly regulating a gas flow speed based on gas pressure regulated by said pressure-proportioning valve.

In the gas control system as described above, said working gas is nitrogen.

In another aspect, the present application further provides a gas control method for a reflow soldering furnace, wherein a furnace chamber of said reflow soldering furnace comprises a preheating zone and a cooling zone, characterized in that said gas control method comprises the following steps: detecting an oxygen concentration in said furnace chamber, wherein said detected oxygen concentration reflects an actual detection value; setting a regulation set value and a target set value of an oxygen concentration, said regulation set value being greater than said target set value; when said actual detection value is greater than said regulation set value, increasing the opening extent of a first intake valve device and that of a second intake valve device until said actual detection value is smaller than said regulation set value, wherein said first intake valve device establishes fluid communication between said preheating zone and said working gas source, and said second intake valve device establishes fluid communication between said cooling zone and said working gas source; and when said actual detection value is smaller than said regulation set value, keeping the opening extent of said first intake valve device at a preset value and decreasing the opening extent of said second intake valve device until said actual detection value is equal to said target set value.

The gas control method as described above further comprises the following steps: when said reflow soldering furnace is working stably, keeping the opening extent of said first intake valve device at a preset value and regulating the opening extent of said second intake valve device, thereby stabilizing said actual detection value around said target set value, wherein when said actual detection value is smaller than said target set value, the opening extent of said second intake valve device is decreased until said actual detection value is equal to said target set value; when said actual detection value is greater than said target set value, the opening extent of said second intake valve device is increased until said actual detection value is equal to said target set value; and when said actual detection value is equal to said target set value, the opening extent of said second intake valve device is kept at a current value.

In the gas control method as described above, the furnace chamber further comprises a peak value zone; an oxygen concentration in said furnace chamber comprises: an oxygen concentration in said peak value zone.

The gas control method as described above further comprises the following steps: detecting a working state of said reflow soldering furnace; and upon detecting that said reflow soldering furnace is not in a working state, decreasing the opening extent of said first intake valve device and that of said second intake valve device to output and supply a working gas at the lowest flow rate.

BRIEF DESCRIPTION OF THE DRAWINGS

The present application will be made easier to understand by reading the following detailed description with reference to the drawings. In the drawings, the same reference numeral represents the same component.

DETAILED DESCRIPTION

Figure 1:
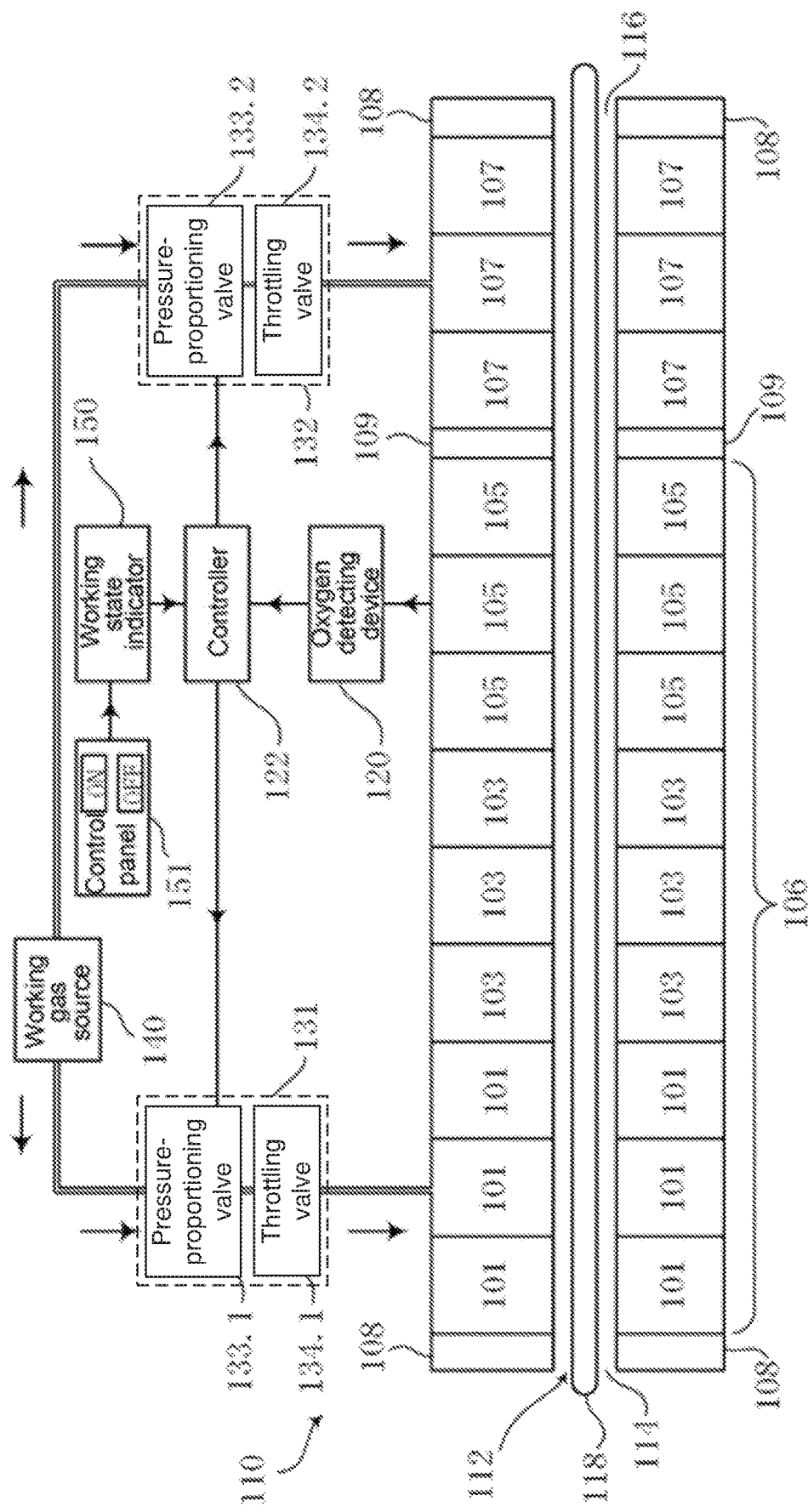
FIG. 1 is a schematic diagram for an embodiment of a reflow soldering furnace and a gas control system therefor according to the present application.

Specific embodiments of the present application will be described with reference to drawings that constitute part of the specification. It should be understood that although terms for indicating directions, such as "front", "rear", "upper", "lower", "left", "right", "inner", "outer", "top", and "bottom", are used herein to describe structural parts and components of each embodiment of the present application, use of these terms herein is only intended for convenience of explanation, and these terms are determined on the basis of the embodiment orientations shown in the drawings. Embodiments disclosed by the present application may be disposed in different directions, and so these terms indicating directions are only illustrative, instead of being construed as limiting.

FIG. 1 is a schematic diagram for an embodiment of a reflow soldering furnace and a gas control system therefor according to the present application, showing a view taken from a lateral face of the reflow soldering furnace. As shown in FIG. 1, the reflow soldering furnace 110 comprises a furnace chamber 112, a preheating zone 101, a soaking zone 103, a peak value zone 105, and a cooling zone 107. Between the peak value zone 105 and the cooling zone 107, a baffle exhaust zone 109 is further disposed. The furnace chamber 112 passes through the preheating zone 101, the soaking zone 103, the peak value zone 105, and the cooling zone 107, and the preheating zone 101, the soaking zone 103, the peak value zone 105, and the cooling zone 107 are in fluid communication via the furnace chamber 112. Further, each of the preheating zone 101, the soaking zone 103, the peak value zone 105, and the cooling zone 107 is also in fluid communication with the furnace chamber 112. The furnace chamber 112 comprises an inlet 114 and an outlet 116. The reflow soldering furnace 110 further comprises a conveying device 118, the conveying device 118 being disposed passing through the furnace chamber 112 and configured to convey a circuit board to be processed into the furnace chamber 112 via the inlet 114 of the furnace chamber 112 and convey a circuit board processed by the reflow soldering furnace 110 out of the furnace chamber 112 via the outlet 116 of the furnace chamber 112. The reflow soldering furnace 110 may use an inert gas, for example, nitrogen, as a working gas. An explanation will be given below using nitrogen as a working gas. Note that FIG. 1 shows a view taken from a lateral face of the reflow soldering furnace 110, wherein for convenience of explanation of the reflow soldering furnace 110, a casing for sheltering from the front and rear of the furnace chamber 112 is omitted in FIG. 1.

A heating device is disposed in the preheating zone 101, the soaking zone 103, and the peak value zone 105, respectively, and these zones jointly form a heating zone 106. In the embodiment shown in FIG. 1, the heating zone 106 comprises three preheating zones 101, three soaking zones 103, and three peak value zones 105. The preheating zones 101, the soaking zones 103, and the peak value zones 105 are successively connected, in which the temperature rises gradually. In the preheating zones 101 and the soaking zones 103, a circuit board is heated, and part of the flux in the soldering paste allocated to the circuit board will be vaporized. The peak value zone 105 has a higher temperature than the preheating zone 101 or the soaking zone 103, and the soldering paste is melted in the peak value zone 105. The peak value zone 105 is also the zone in which a VOC having a higher temperature, for example, rosin or resin, will be vaporized. In the embodiment shown in FIG. 1, the reflow soldering furnace 110 comprises three cooling zones 107, and a cooling device is disposed in each of these zones. After a circuit board is conveyed from the heating zone 106 into the cooling zone 107, the soldering paste is cooled and solidified in the soldering area of the circuit board, thereby connecting an electronic component to the circuit board. Note that the numbers of the preheating zones 101, the soaking zones 103, the peak value zones 105, and the cooling zones 107 may be changed according to the products to be soldered and different soldering processes, instead of being limited to the embodiment shown in FIG. 1.

In a connecting area between the heating zone 106 and the cooling zone 107, a baffle exhaust zone 109 is disposed. The baffle exhaust zone 109 may draw out or discharge a gas from the furnace chamber 112, thereby blocking or reducing gas containing a volatile contaminant that enters the cooling zone 107 from the heating zone 106. In addition, by drawing out or discharging a gas from the furnace chamber 112, the baffle exhaust zone 109 may also be used as a thermal insulation zone that separates the high-temperature heating zone 106 and the low-temperature cooling zone 107.

The reflow soldering furnace 110 according to the present application may use nitrogen as a working gas. The reflow soldering furnace 110 is provided with a working gas source 140, for supplying a clean working gas to the furnace chamber 112. The reflow soldering furnace 110 further comprises a gas baffle zone 108 located at the inlet 114 and the outlet 116 of the furnace chamber 112. The gas baffle zone 108 is configured to supply nitrogen to the furnace chamber 112, thereby forming a nitrogen curtain, and the nitrogen curtain can prevent air in the external environment from entering the furnace chamber 112. The reflow soldering furnace 110 is further provided with a gas discharge device (not shown in the figure), for discharging the gas containing a volatile contaminant in the furnace chamber 112. A gas discharge device is generally connected to a high-temperature zone of the reflow soldering furnace 110, for example, the soaking zone 103, the peak value zone 105, or the baffle exhaust zone 109. When the reflow soldering furnace 110 is in a state of processing a circuit board, the gas discharge device keeps working so that the gas in the furnace chamber 112 remains clean. In this process, it is also necessary to keep inputting clean nitrogen from the working gas source 140, thereby maintaining a working atmosphere and working pressure required by the furnace chamber 112.

Since a relatively small amount of external air inevitably enters the furnace chamber 112 when the conveying device 118 conveys a circuit board into or out of the furnace chamber 112, the working gas in the furnace chamber 112 always contains oxygen. Different soldering processes require different oxygen concentrations in the furnace chamber 112, generally in a range of 500 to 5000 parts per million (PPM). It is hoped that an oxygen concentration in the furnace chamber 112 remains around a value required by a specific soldering process. Thus, the requirement on soldering quality is met, while nitrogen is saved.

For this purpose, the reflow soldering furnace 110 according to the present application is further provided with a gas control system, for regulating an oxygen concentration in the furnace chamber 112 by regulating the amount of nitrogen supplied to the furnace chamber 112, so that the oxygen concentration reaches a level required by a specific soldering process in a reflow soldering furnace. Further, said gas control system is further configured to, based on a working state of the reflow soldering furnace 110, control start and stop of the working gas source 140.

Again referring to FIG. 1, a gas control system for the reflow soldering furnace 110 comprises an oxygen detecting device 120, a first intake valve device 131, a second intake valve device 132, and a controller 122. The oxygen detecting device 120, in contact with a gas in the furnace chamber 112, is configured to detect an oxygen concentration in the furnace chamber 112 and generate an oxygen concentration signal based on the detected oxygen concentration. The first intake valve device 131 and the second intake valve device 132 are configured to controllably establish fluid communication between the working gas source 140 and the furnace chamber 112, thereby inputting nitrogen into the furnace chamber 112. The controller 122 is configured to, based on an oxygen concentration signal, control the opening extent of the first intake valve device 131 and that of the second intake valve device 132 to regulate the amount of nitrogen supplied to the furnace chamber 112, thereby regulating the oxygen concentration in the furnace chamber 112. Said opening extent indicates an extent of valve opening, in a range of 0% to 100%, wherein 0% indicates that the valve is closed and 100% indicates that the valve is fully open. Said oxygen concentration signal reflects an actual detection value DV of an oxygen concentration.

In the embodiment shown in FIG. 1, the first intake valve device 131 and the second intake valve device 132 each comprise a pressure-proportioning valve and a throttling valve. Specifically, the first intake valve device 131 comprises a first pressure-proportioning valve 133.1 and a first throttling valve 134.1, and the second intake valve device 132 comprises a second pressure-proportioning valve 133.2 and a second throttling valve 134.2. The first pressure-proportioning valve 133.1 and the second pressure-proportioning valve 133.2 are connected to the working gas source 140 to controllably regulate the pressure of nitrogen received from the working gas source 140. The first throttling valve 134.1 and the second throttling valve 134.2 are connected to the first pressure-proportioning valve 133.1 and the second pressure-proportioning valve 133.2, respectively, to linearly regulate a gas flow speed based on gas pressure regulated by the first pressure-proportioning valve 133.1 and the second pressure-proportioning valve 133.2. For example, the first pressure-proportioning valve 133.1 and the second pressure-proportioning valve 133.2 may regulate gas pressure within a range of 0 MPa to 1 MPa; correspondingly, the first throttling valve 134.1 and the second throttling valve 134.2 may linearly regulate a gas flow speed based on gas pressure within a range of 0 m3/hour to 18 m3/hour. The first pressure-proportioning valve 133.1 and the second pressure-proportioning valve 133.2 are connected to the controller 122, so that the opening extent of the first pressure-proportioning valve 133.1 and that of the second pressure-proportioning valve 133.2 can be controlled by the controller 122, while the first throttling valve 134.1 and the second throttling valve 134.2 can automatically regulate a gas flow speed respectively based on gas pressure regulated by the first pressure-proportioning valve 133.1 and the second pressure-proportioning valve 133.2. The flow speed of the gas is regulated by a combination of pressure-proportioning valves and throttling valves to reach a desired gas flow speed while creating desired gas pressure.

To meet an oxygen concentration requirement of a specific soldering process, in the present application, a specific oxygen concentration target set value TV is preset and is stored in the controller 122. The controller 122 can identify said target set value TV, compare an actual detection value DV reflected by an oxygen concentration signal generated by the oxygen detecting device 120 with a preset target set value TV, and, based on a comparison result, control the opening extent of the first pressure-proportioning valve 133.1 and that of the second pressure-proportioning valve 133.2. If the actual detection value DV is greater than the preset target set value TV, it indicates that the oxygen concentration is too high while the nitrogen concentration is too low and that therefore the nitrogen input needs to be increased; otherwise, the nitrogen input needs to be decreased.

Still referring to FIG. 1, the first intake valve device 131 establishes fluid communication between the preheating zone 101 and the working gas source 140, and the second intake valve device 132 establishes fluid communication between the cooling zone 107 and the working gas source 140; In each area of the heating zone 106, gas temperatures gradually increase from left to right, and different gas temperatures are required in different areas to meet different soldering process requirements. Nitrogen is supplied to the furnace chamber 112 from a position of the preheating zone 101 near the inlet 114 and the cooling zone 107 near the outlet 116, so that room-temperature nitrogen from the working gas source 140 enters an area having a lower temperature, thereby preventing any significant impact on the gas temperature in an area having a higher temperature. Note that, however, one intake valve device may also be disposed, or two or more intake valve devices may also be disposed, and an intake valve device may also establish fluid communication between another area of the heating zone and the working gas source, which falls into the protection scope of the present application.

Further, the gas control system comprises a working state indicating device 150, for indicating whether the reflow soldering furnace 110 is in a state of processing a circuit board or in a state of not processing any circuit board. When the reflow soldering furnace 110 is in a state of not processing any circuit board, it is hoped that the intake valve devices 131 and 132 (for example, by decreasing the opening extent of the intake valve devices 131 and 132) output and supply nitrogen at the lowest flow rate, and that the intake valve devices 131 and 132 are closed when the lowest flow rate is zero.

Generally, when the ON/OFF control key on the control panel 151 of the reflow soldering furnace is pressed, the reflow soldering furnace 110 starts/stops processing a circuit board. For example, when the reflow soldering furnace 110 is started/stopped, a state indication signal indicating a start/stop is sent to the working state indicating device 150. Alternatively, when the reflow soldering furnace 110 is in a work intermission, for example, when no circuit board is being processed in the furnace chamber 112, a relevant sensor or detecting device sends a corresponding state indication signal to the working state indicating device 150. When the working state indicating device 150, after receiving a state indication signal from the control panel or a detecting device, indicates to the controller 122 that the reflow soldering furnace 110 is in a state of not processing any circuit board, the controller 122 closes the first intake valve device 131 and the second intake valve device 132 to stop nitrogen supply in a timely manner. As an embodiment of the present application, the working state indicating device 150 may be a D trigger or an RS trigger, capable of outputting different state signals (such as a high level and a low level) to indicate different states of the reflow soldering furnace 110 (for example, a high level indicates that the furnace is working and a low level indicates that the furnace is stopped, or a low level indicates that the furnace is working and a high level indicates that the furnace is stopped). As an embodiment, the D trigger or RS trigger may be controlled by the control panel 151; on the control panel 151, the ON and OFF control keys may set the output of the D trigger or RS trigger to a high level or a low level, for indicating different working states.

In the embodiment shown in FIG. 1, the oxygen detecting device 120 comes into contact with a gas in the peak value zone 105, for detecting an oxygen concentration in the peak value zone 105. In the reflow soldering furnace 110, the peak value zone 105 has the highest temperature and is an area that has a significant impact on soldering quality in the process of soldering. Therefore, in the present application, an oxygen concentration in the peak value zone 105 is detected and a nitrogen supply amount is regulated on the basis of the detected oxygen concentration in the peak value zone 105, so that the oxygen concentration in the peak value zone 105 is kept at a target set value required by the soldering process, thereby significantly improving the soldering quality.

Figure 2A:
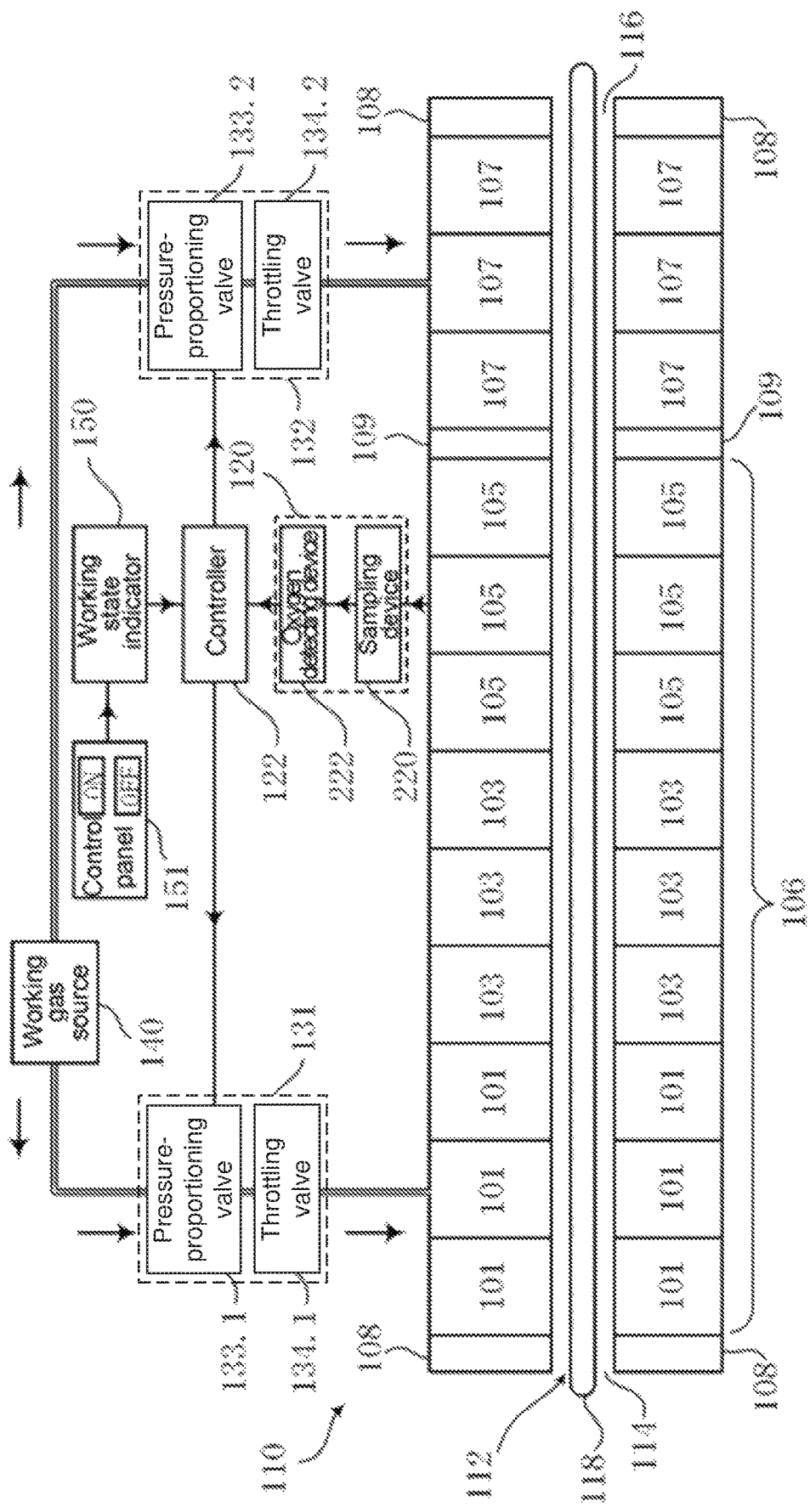
FIGS. 2A and 2B are schematic diagrams for different embodiments of the gas control system shown in FIG. 1.
Figure 2B:
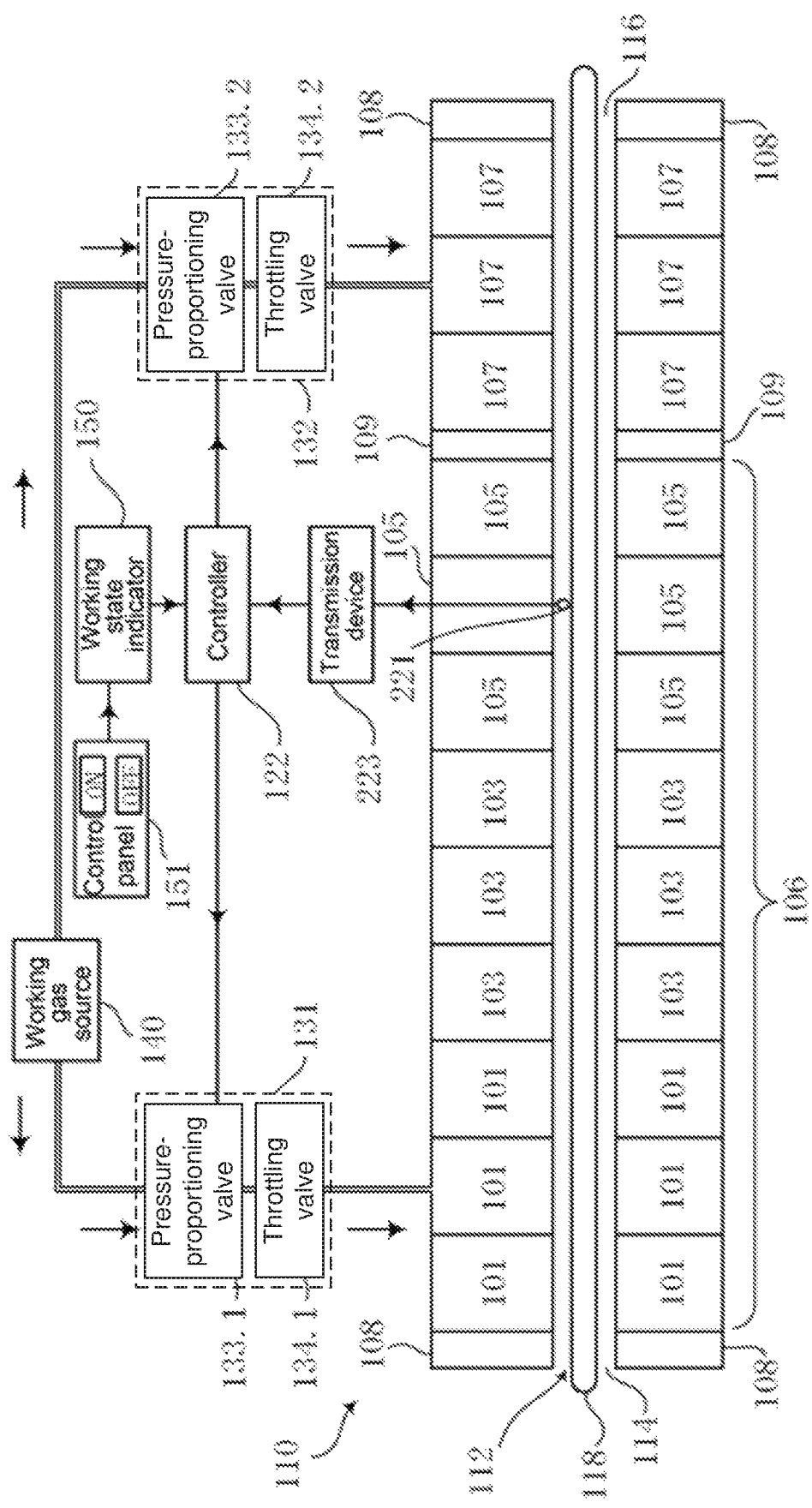

FIGS. 2A and 2B respectively show schematic diagrams for two different embodiments of the gas control system shown in FIG. 1, wherein the embodiments shown in FIGS. 2A and 2B comprise different oxygen detecting devices 120.

In the embodiment shown in FIG. 2A, the oxygen detecting device 120 comprises a sampling device 220 and an oxygen analyzer 222. The sampling device 220, in fluid communication with the furnace chamber 112, is configured to collect a gas in the furnace chamber 112. The oxygen analyzer 222 is connected to the sampling device 220 and configured to analyze an oxygen concentration in the gas collected the sampling device 220, thereby obtaining an actual detection value DV of the oxygen concentration. The oxygen analyzer 222 is further connected to the controller 122 and configured to transfer the actual detection value DV of the oxygen concentration obtained by an analysis to the controller 122.

Further, before the sampling device 220 collects a gas, the gas may be filtered to prevent any volatile contaminant contained in the gas in the furnace chamber 112 from affecting the normal operation of the oxygen analyzer 222, thereby improving the analytic precision of the oxygen analyzer 222 and prolonging the service life of the oxygen analyzer 222.

In the embodiment shown in FIG. 2B, the oxygen detecting device 120 comprises an oxygen probe 221 and a transmission device 223. The oxygen probe 221 is inserted into the furnace chamber 112, and is configured to detect an oxygen concentration in the furnace chamber 112 and generate an oxygen concentration signal. The transmission device 223 is connected to the oxygen probe 221, and is configured to transmit an oxygen concentration detected by the oxygen probe 221 to the controller 122. A gas contact surface is provided at the front end of the oxygen probe 221, allowing an oxygen concentration of a gas to be detected by coming into contact with the gas. The front end of the oxygen probe 221 is inserted into the furnace chamber 112 for detection, achieving fast detection and high detection precision; in addition, since no additional air duct needs to be installed, production and use is convenient. The transmission device 223 may convert an oxygen concentration signal detected by the oxygen probe 221 to a format suitable for reception and processing by the controller 122, for example, the RS485 format, and then transmit the signal to the controller 122. The transmission device 223 may be a standalone device, or may be integrated with the oxygen probe 221. In another embodiment, the transmission device 223 may also be integrated with the controller 122.

Figure 3:
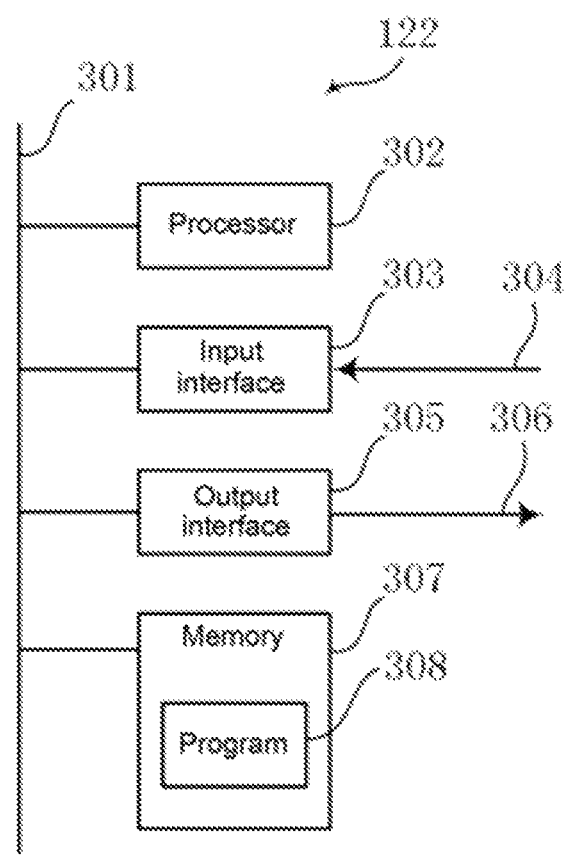
FIG. 3 is a schematic diagram for an embodiment of the controller shown in FIG. 1.

FIG. 3 is a schematic diagram for an embodiment of the controller 122 shown in FIG. 1. The controller 122 comprises a bus 301, a processor 302, an input interface 303, an output interface 305, and a memory 307 storing a control program 308. The processor 302, the input interface 303, the output interface 305, and the memory 307 are connected for communication via the bus 301, allowing the processor 302 to control the operation of the input interface 303, the output interface 305, and the memory 307. The memory 307 is configured to store a program, an instruction, and data, and the processor 302 is configured to read a program, an instruction, and data from the memory 307, capable of writing data to the memory 307.

The input interface 303 receives, via a connection 304, a signal and data, for example, a signal sent by the working state indicating device 150 that indicates a working state of the reflow soldering furnace 110, an oxygen concentration signal sent by the oxygen detecting device 120, and various manually input parameters. The output interface 305 sends, via a connection 306, a signal and data, for example, sending a control signal for regulating an opening extent to intake valve devices 131 and 132. The memory 307 stores a control program, a preset target set value and a regulation set value of an oxygen concentration, and other data. Various parameters may be preset in the engineering during manufacture, or various parameters may be set by manual input or data import. The processor 302 receives, through the interface 303 and the memory 307, various signals, data, programs, and instructions, processes them accordingly, and then produces output through the interface 305.

Figure 4:
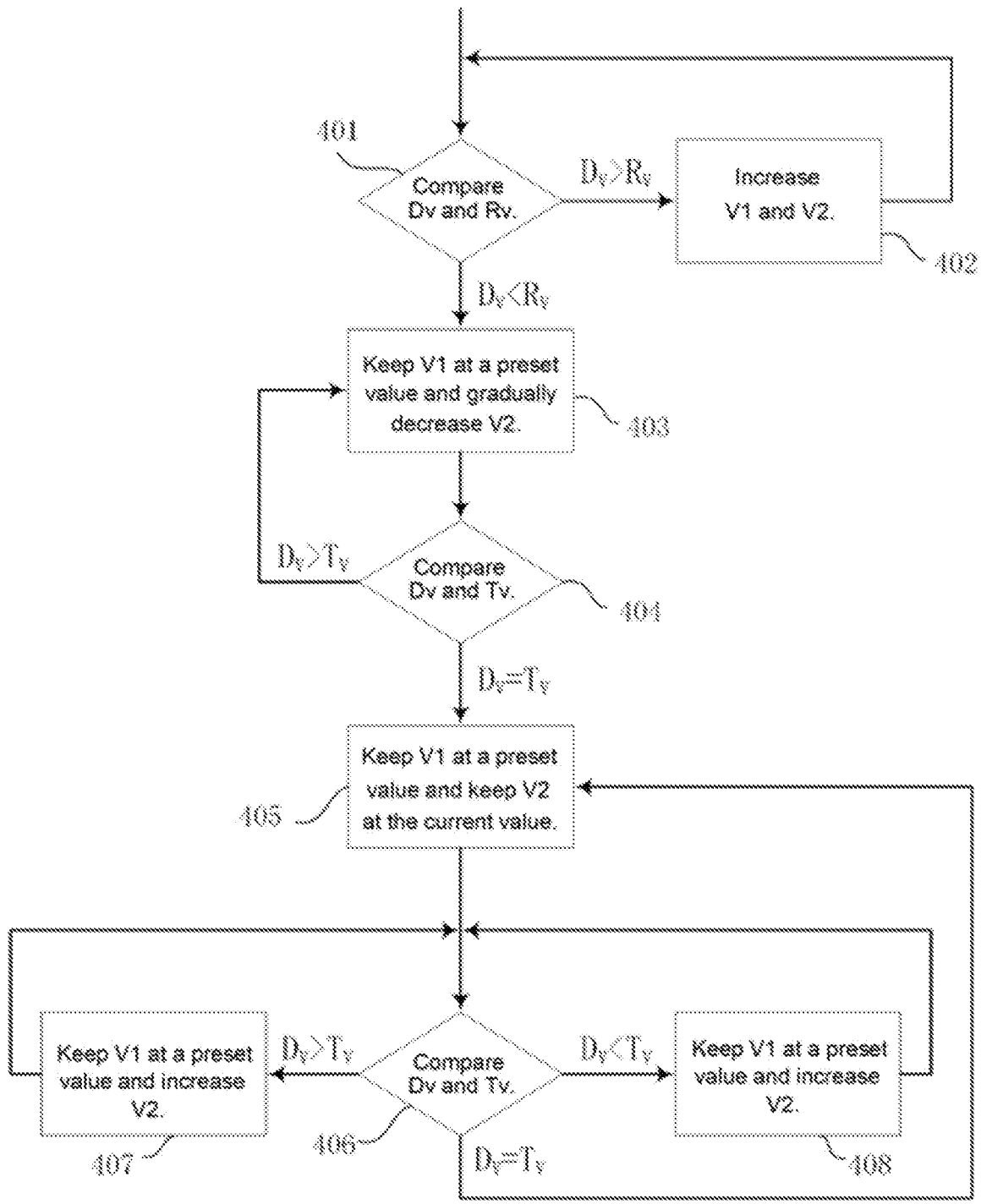
FIG. 4 is flowchart of a nitrogen input control method for the reflow soldering furnace and a gas control system therefor shown in FIG. 1.

FIG. 4 is flowchart of a nitrogen input control method for the reflow soldering furnace and a gas control system therefor shown in FIG. 1, showing an embodiment of a method for controlling nitrogen input when the nitrogen input needs to be increased because the actual detection value DV of the oxygen concentration is much greater than the target set value TV.

In the present application, in order to achieve more precise regulation, the corresponding regulation set value RV of an oxygen concentration is further preset according to different soldering process requirements and is stored in the memory 307 of the controller 122. The regulation set value RV is greater than said target set value TV. When the nitrogen input needs to be increased because the actual detection value DV of the oxygen concentration is much greater than the target set value TV, regulation of nitrogen input may be divided into two processes, rough regulation and fine regulation, by means of the regulation set value RV being provided. Generally speaking, in the rough regulation process of the present application, opening extent V1 of the first pressure-proportioning valve 133.1 and opening extent V2 of the second pressure-proportioning valve 133.2 are both regulated; in the fine regulation process, only the second pressure-proportioning valve 133.2 closer to the oxygen detection zone (namely, the peak value zone 105) is selected for regulation, while opening extent V1 of the first pressure-proportioning valve 133.1 is kept at a preset value. A corresponding preset value of V1 may be set on the basis of the target set value TV. For example, when the target set value TV is 500 PPM, the preset value of V1 is set to 35%; when the target set value TV is 1000 PPM, the preset value of V1 is set to 30%.

Specifically, as shown in FIG. 4, the actual detection value DV of the oxygen concentration is much greater than the target set value TV, the following steps are performed:

Step 401: Compare the actual detection value DV with the regulation set value RV. If the actual detection value DV is greater than the regulation set value RV, go to Step 402; if the actual detection value DV is smaller than the regulation set value RV, go to Step 403.

Step 402: Increase opening extent V1 of the first pressure-proportioning valve 133.1 and opening extent V2 of the second pressure-proportioning valve 133.2, until the actual detection value DV is smaller than the regulation set value RV.

Step 403: Keep opening extent V1 of the first pressure-proportioning valve 133.1 at a preset value and gradually decrease opening extent V2 of the second pressure-proportioning valve 133.2, until the actual detection value DV of the oxygen concentration detected in Step 404 is lowered to be equal to the target set value TV.

Step 404: Compare the actual detection value DV with the target set value TV. Since Step 403 is performed, the actual oxygen concentration gradually decreases, leading to a gradual decrease in the actual detection value DV. When the actual detection value DV is lowered to be equal to the target set value TV, go to Step 405.

Step 405: Keep opening extent V1 of the first pressure-proportioning valve 133.1 at a preset value, and keep opening extent V2 of the second pressure-proportioning valve 133.2 at the current value. Then, proceed to Step 406.

Step 406: Compare the actual detection value DV with the target set value TV. Since the actual oxygen concentration fluctuates slightly as a circuit board is conveyed into and out of the furnace chamber 112 after Step 405 is performed, continue comparing the actual detection value DV with the target set value TV in Step 406. If the detected actual detection value DV is greater than the target set value TV, go to Step 407; if the detected actual detection value DV is smaller than the target set value TV, go to Step 408; and if the detected actual detection value DV is still equal to the target set value TV, go to Step 405.

Step 407: Keep opening extent V1 of the first pressure-proportioning valve 133.1 at a preset value and increase opening extent V2 of the second pressure-proportioning valve 133.2, until the actual detection value DV is decreased to be equal to the target set value TV.

Step 408: Keep opening extent V1 of the first pressure-proportioning valve 133.1 at a preset value and decrease opening extent V2 of the second pressure-proportioning valve 133.2, until the actual detection value DV is increased to be equal to the target set value TV.

Operation steps of an embodiment of a nitrogen control method according to the present invention have been described above. Among the steps, Step 402 is a rough regulation process, in which nitrogen input can be significantly increased by concurrently increasing the opening extents of the pressure-proportioning valves 133.1 and 133.2, thereby decreasing the oxygen concentration rapidly. In Steps 403 to 408, the fine regulation process is performed, in which opening extent V1 of the first pressure-proportioning valve 133.1 is kept at a preset value, while only opening extent V2 of the second pressure-proportioning valve 133.2 is regulated; thus, nitrogen input can be regulated stably so that the actual detection value DV can gradually approach and be stabilized at the target set value TV, thereby ensuring that a desired oxygen concentration is reached while saving nitrogen. For example, when the reflow soldering furnace 110 is working stably, the second pressure-proportioning valve 133.2 can be finely regulated so that the actual detection value DV is stabilized at the target set value TV or fluctuates only slightly around the target set value TV. One the one hand, a circuit board can be processed in a working atmosphere having a relatively stable concentration, which improves the process precision and processing effect; on the other hand, nitrogen can be saved and energy consumption reduced effectively.

Note that the nitrogen input control method shown in FIG. 4 is only one embodiment of the present application. Those of ordinary skill in the art may alter the control method for nitrogen input based on specific configurations of a gas control system. For example, in the fine regulation process, opening extent of the second pressure-proportioning valve 133.2 is kept at a preset value, while only opening extent of the first pressure-proportioning valve 133.1 is regulated; any such alterations fall into the protection scope of the present application.

In this specification, the present application has been disclosed by embodiments, one or more of which are shown in the drawings. Each embodiment is provided for the purpose of explaining the present application, instead of limiting the present application. In fact, it is readily apparent to those of ordinary skill in the art that various modifications and variations may be made to the present application without departing from the scope or spirit of the present application. For example, a characteristic illustrated or described as part of an embodiment may be combined with another embodiment to obtain a further embodiment. Therefore, it is intended that the present application covers any modifications and variations made within a scope defined by the attached claims and an equivalent thereof.

What is claimed is:

1. A gas control system for a reflow soldering furnace, a furnace chamber of said reflow soldering furnace comprising a preheating zone and a cooling zone and containing a gas, said gas comprising oxygen and a working gas, wherein said gas control system comprises:

an oxygen detecting device positioned to come into contact with said gas in said furnace chamber for detecting an oxygen concentration in said furnace chamber wherein said oxygen detecting device generates an oxygen concentration signal based on the detected oxygen concentration;

a first intake valve device in fluid communication with said preheating zone and a working gas source, and a second intake valve device in fluid communication with said cooling zone and said working gas source, wherein said first intake valve device is configured to controllably establish fluid communication between said preheating zone and a working gas source, and said second intake valve device is configured to controllably establish fluid communication between said cooling zone and said working gas source; and a controller configured to:

determine a regulation set value ($R_V$) of an oxygen concentration, said regulation set value ($R_V$) being greater than a target set value ($T_V$) of an oxygen concentration, the target set value ($T_V$) being set based on an oxygen concentration requirement for a soldering process;

regulate a flow rate of the working gas inputted into said furnace chamber by:

when an actual detection value ($D_V$) reflected by said oxygen concentration signal is greater than said regulation set value ($R_V$), increasing the opening extent of said first intake valve device and that of said second intake valve device; and when an actual detection value ($D_V$) reflected by said oxygen concentration signal is smaller than said regulation set value ($R_V$), controlling the opening extent of said first intake valve device to remain at a preset value and regulate the opening extent of said second intake valve device based on comparing the actual detection value ($D_V$) to the target set value ($T_V$).

2. The gas control system as claimed in claim 1, wherein:

said furnace chamber comprises a peak value zone; and said oxygen detecting device comes into contact with a gas in said peak value zone to detect an oxygen concentration in said peak value zone.

3. The gas control system as claimed in claim 1, further comprising:

a working state indicating device, for indicating whether said reflow soldering furnace is in a state of processing a circuit board or in a state of not processing any circuit board;

wherein when said working state indicating device indicates that said reflow soldering furnace is in a state of not processing any circuit board, said controller is configured to cause said at least one intake valve device to output and supply a working gas at the lowest flow rate.

4. The gas control system as claimed in claim 1, wherein said oxygen detecting device comprises:
   a sampling device, said sampling device being in fluid communication with said furnace chamber for collecting a gas in said furnace chamber;
   an oxygen analyzer, said oxygen analyzer being connected to said sampling device, for analyzing an oxygen concentration in the collected gas; and
   said oxygen analyzer is connected to said controller, for generating said oxygen concentration signal based on an oxygen concentration obtained by an analysis with said oxygen analyzer, and transferring said oxygen concentration signal to said controller.

5. The gas control system as claimed in claim 1, wherein said oxygen detecting device comprises:
   an oxygen probe, said oxygen probe being inserted into said furnace chamber for detecting an oxygen concentration in said furnace chamber; and
   said oxygen probe is connected to said controller, for generating said oxygen concentration signal based on an oxygen concentration detected by said oxygen probe, and transferring said oxygen concentration signal to said controller.

6. The gas control system as claimed in claim 1, wherein each of said at least one intake valve device comprises:
   a pressure-proportioning valve, said pressure-proportioning valve being connected to said working gas source, for receiving a working gas from said working gas source, said pressure-proportioning valve being connected to said controller, for regulating gas pressure as controlled by said controller; and
   a throttling valve, said throttling valve being connected to said pressure-proportioning valve, for linearly regulating a gas flow speed based on gas pressure regulated by said pressure-proportioning valve.

7. The gas control system as claimed in claim 1, wherein said working gas is nitrogen.

* * * * *